June 15, 1943. H. E. STOVER 2,321,779
APPARATUS FOR SEALING CONTAINERS
Filed Aug. 2, 1940 7 Sheets-Sheet 1

INVENTOR
Harry E. Stover.
BY
ATTORNEY

June 15, 1943.　　　　H. E. STOVER　　　　2,321,779
APPARATUS FOR SEALING CONTAINERS
Filed Aug. 2, 1940　　　　7 Sheets-Sheet 7

INVENTOR
Harry E. Stover.
BY
ATTORNEY

Patented June 15, 1943

2,321,779

UNITED STATES PATENT OFFICE 2,321,779

APPARATUS FOR SEALING CONTAINERS

Harry E. Stover, Leonia, N. J., assignor to Anchor Hocking Glass Corporation, Lancaster, Ohio, a corporation of Delaware Application August 2, 1940, Serial No. 349,655

13 Claims. (Cl. 226—82)

My invention relates to an apparatus for sealing containers. It has to do, more particularly, with an apparatus for applying closures to containers, such as food containers and including jars, bottles, cans, et cetera, and sealing them on the containers and for producing a partial vacuum in the upper ends of the containers.

This application is a continuation-in-part of my copending application, Serial No. 319,312, filed February 16, 1940, which issued as Patent No. 2,309,548.

The present invention deals with a machine which is similar in its general structure to that disclosed in my copending application. In the machine of the present invention, I have provided a number of improvements in the cylinder and piston unit employed for actuating the sealing head of the machine. These improvements include a novel adjustable stop structure associated with the cylinder and piston unit for preventing movement of the toggle structure past center when the sealing head is actuated. It also includes a cushioning structure for reducing shock when the piston reaches the extent of its movement when actuating the sealing head.

The preferred embodiment of my invention is illustrated in the accompanying drawings, wherein similar characters of reference designate corresponding parts and wherein.

With reference to the drawings, I have illustrated a machine which comprises generally a conveyer unit 1, a cap feeding and applying unit 2 and a sealing head unit 3.

The conveyer unit 1 may be of any suitable type. For example, it may be of the type disclosed in the co-pending application of William D. Bell, on Apparatus for sealing containers, Serial No. 314,299, filed January 17, 1940. However, it is to be understood that my apparatus may be associated with any suitable type of conveyer unit. The conveyer unit preferably embodies means for continuously moving the containers into proper association with the units 2 and 3, including means for centering the containers relative to said units.

Figure 6:
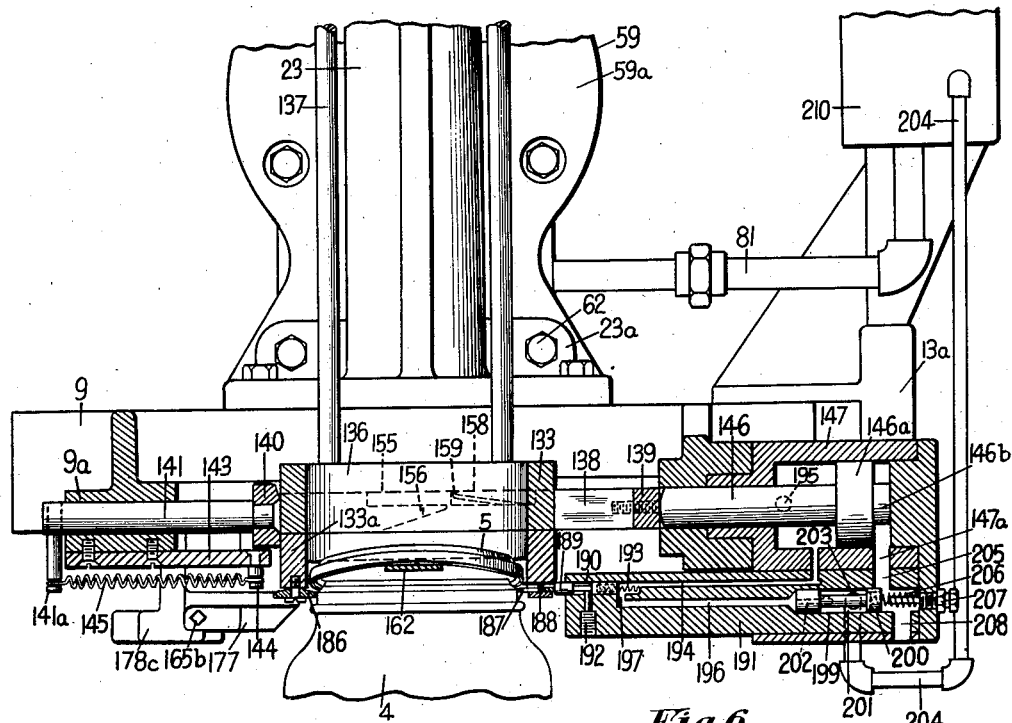
Figure 6 is a transverse vertical sectional view taken substantially along line 6—6 of Figure 2.
Figure 12:
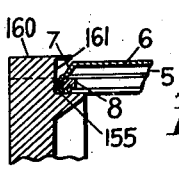
Figure 12 is a transverse vertical sectional view of one of the wedges showing how it normally supports a cap.

My invention is not limited to use with any particular type of container and cooperating cap but for illustrative purposes I have shown in Figure 6 a container 4 adapted to receive the cap 5 on its upper end. This cap preferably embodies a substantially disk-like portion 6 (Figure 12) which has a depending annular skirt 7 which carries an annular gasket 8 therewithin. When the cap is forced downwardly onto the upper end of the container, the frictional contact of the gasket with the upper end of the container will aid in maintaining the cap in position and will seal the cap on the container.

The containers 4 are placed indiscriminately on the conveyer and are moved in the direction of the arrows (Figures 1 and 2) by the conveyer. The containers are centered thereon in the manner described in said co-pending application Serial No. 314,299. They are first carried to the cap feeding and applying unit 2. This unit is of such a type that it will apply a cap loosely to the upper end of the container. After the container passes the unit 2, it passes to the sealing head unit 3. This sealing head unit 3 is adapted to displace the air from the head space and to sterilize such space and the cap before the sealing operation.

Figure 1:
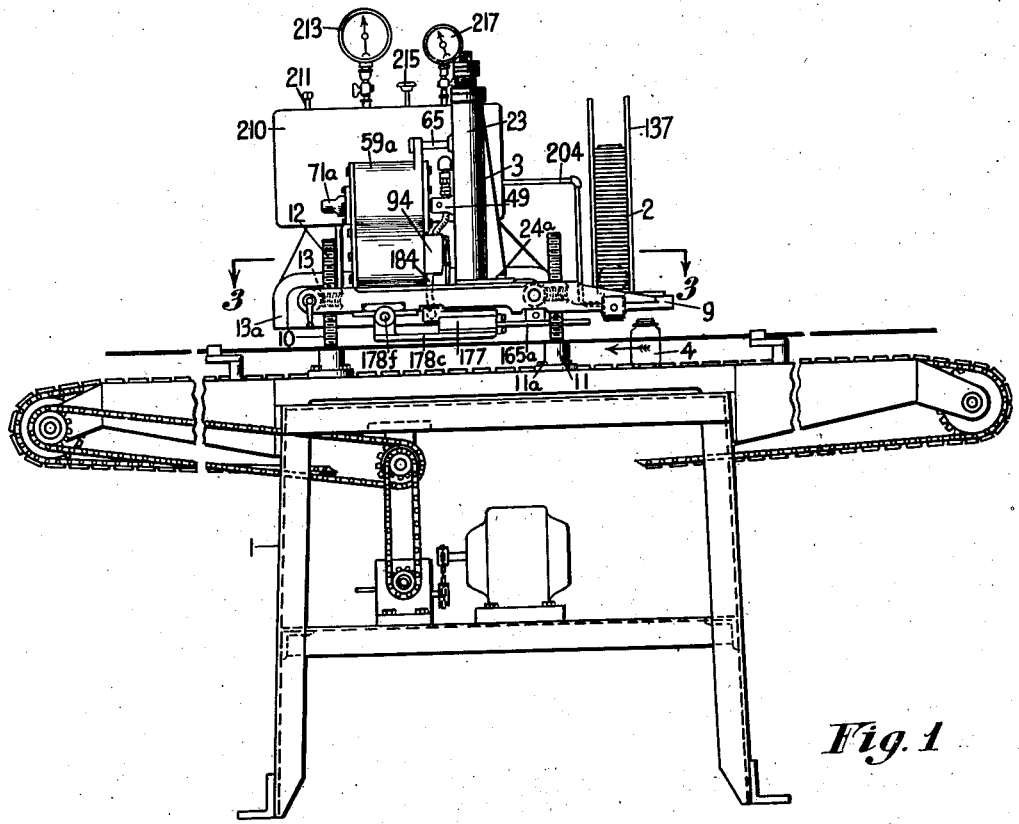
Figure 1 is a side elevational view of a machine constructed in accordance with my invention.
Figure 2:
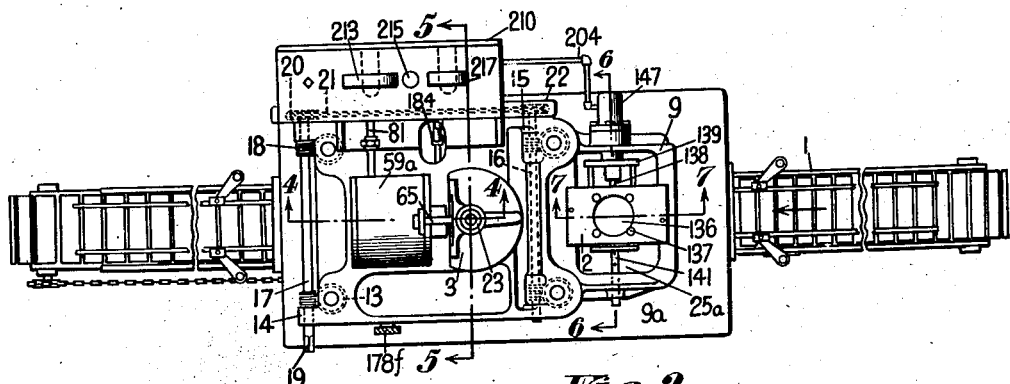
Figure 2 is a plan view of the machine shown in Figure 1.

The units 2 and 3 are disposed directly adjacent each other. They are both supported by a horizontally disposed plate 9. The plate 9 is supported at a point spaced above the conveyer unit 1 by means of four vertically disposed non-rotatable posts 10 two of which are disposed at the left-hand corners of the plate (Figure 1) and the other two of which are spaced a substantial distance from the right-hand end of the plate. Each of these posts 10 is provided with a base portion 11 on its lower end which is suitably secured, as by screw bolts 11a, to a portion of the conveyer unit 1. The upper portion of each of these posts is threaded, as indicated at 12. Each of the posts has an internally threaded worm gear 13 mounted on the threaded portion 12 thereof. Each of these worm gears is disposed directly beneath and engages the plate 9. Formed integral with the left-hand end of plate 9 is a pair of lugs 14 (Figure 2). Formed integral with the plate 9 adjacent its opposite end is a pair of bearing portions 15. The pair of bearing portions 15 rotatably support a horizontally disposed worm shaft 16. The pair of lugs 14 at the other end of the plate 9 rotatably support a horizontally disposed worm shaft 17. Each of the worm shafts 16 and 17 carries a pair of worms 18 which engage the adjacent worm gears 13. The worm shaft 17 is provided with an angular end 19 for receiving a crank by means of which it may be rotated. In order to rotate the shaft 16 simultaneously with the shaft 17, the shaft 17 is provided on its opposite end with a sprocket 20 keyed thereon. This sprocket has a chain 21 passing therearound which also passes around a sprocket 22 keyed on the corresponding end of the shaft 16.

Thus, it will be apparent that when the shaft 17 is rotated, the shaft 16 will be rotated simultaneously and to the same extent. Consequently, by rotating shaft 17, all of the worm gears 13 will be caused to rotate. Since these gears are threaded on the posts 10, they will be moved vertically on the posts. Furthermore, since the gears are in engagement with lower surfaces of the plate 9, the plate 9 will be moved vertically in accordance with the vertical movement of the gears. Thus, the plate 9 may be adjusted vertically to position the units 2 and 3 at the proper height above the conveyer unit, depending upon the height of the containers to be sealed. It will be noted that all portions of my apparatus are carried by the plate 9. Consequently, it is in the form of a unitary structure which may be readily associated with any suitable type of conveyer unit. The worm and gear units are preferably enclosed in a suitable housing 13a as indicated in Figure 1.

The sealing head unit 3 is illustrated best in Figures 1 to 7. It comprises a vertically disposed cylindrical housing portion 23 which has a base portion 24 that is bolted by means of bolts 24a to the upper surface of the plate 9. Beneath the base portion 24 (Figure 4), the plate 9 is provided with a large opening 25, in order to permit vertical movement of the sealing head 26. This sealing head embodies a substantially cylindrical portion of non-magnetic metal which is carried on the lower end of a plunger 27.

The sealing head 26 is provided with a recess 28 in its upper surface which receives the lower end of the plunger 27. The plunger carries an enlarged portion 29 on its lower end which limits its upward movement by contacting with the lower end of housing 23. The plunger 27 is provided with a vertically disposed bore 30 which has an interiorly threaded lower end that receives the threaded upper portion of a bolt 31. This bolt passes upwardly through a centrally disposed opening 32 in member 26 which is enlarged at its lower end to receive the head 33 of the bolt. The bolt 31 will maintain the head 26 in position on the lower end of the plunger 27. A pin 34 is disposed in aligning openings in the member 26 and lower end of the plunger 27 to prevent relative rotation of these members.

In order to normally maintain the plunger 27 in its uppermost position I provide the following structure. A pin 35 is carried by the housing portion 23 and extends transversely thereof and through a vertically disposed slot 36 formed in the plunger 27. A compression spring 37 has its lower end resting on this pin 35 and its upper end engaging with the upper end of the bore 30. Thus, this spring 37 normally tends to force the plunger 27 upwardly until the enlarged portion 29 thereof contacts with the lower end of the housing portion 23.

Threaded into a collar 38, bolted by bolt 38a to the upper end of the housing portion 23, is a collar 39. This collar 39 has a plunger 40 mounted therein for vertical movement. This plunger has a peripheral flange 41 on its lower end which fits tightly within the housing portion 23. Between the lower end of the collar 39 and the upper surface of the flange 41 and in surrounding relationship to the plunger 40, is a compression spring 42. The spring 42 normally forces the plunger downwardly. The upper end of the plunger 40 is threaded, as indicated at 45, and receives threaded collars 46 which bear against the upper end of the collar 39. The collars 46 will limit downward movement of plunger 40. By rotating the collars 46, the distance between the flange 41 and the collar 39 may be varied and, consequently, the downward force exerted by the spring 42 on the plunger may be varied. By rotating the collar 39 in the member 38, the entire unit including plunger 40, spring 42, collar 39 and collars 46 may be adjusted axially of the housing. The two adjustments just described are provided for a purpose to be explained later. The collar 39 may be held in any adjusted position by means of a lock nut 48 threaded on collar 39.

It will be apparent that the plungers 40 and 27 are disposed in axial alignment. It will also be apparent that the lower end of the plunger 40 is spaced above the upper end of plunger 27. Between these plungers and within the housing portion 23, a toggle joint 49 is disposed. One link 50 of the toggle joint extends upwardly and has its upper end pivotally connected, as at 51, to the bifurcated lower end of the plunger 40. The other link 52 has its lower end pivotally connected, as at 53, to the bifurcated upper end of the plunger 27. The adjacent ends of the links 50 and 52 are pivotally connected together by means of a bifurcated member 54. The member 54 is provided with a socket portion 54a which receives the round end portion 55 of a piston rod 56. A pin 55a holds the end 55 in socket portion 54a. The member 54 extends through vertical slot 57 formed in the housing portion 23. The slot 57 is large enough to permit the required movement of the toggle joint 49, and is of sufficient height to permit limited vertical movement of member 54.

Figure 4:
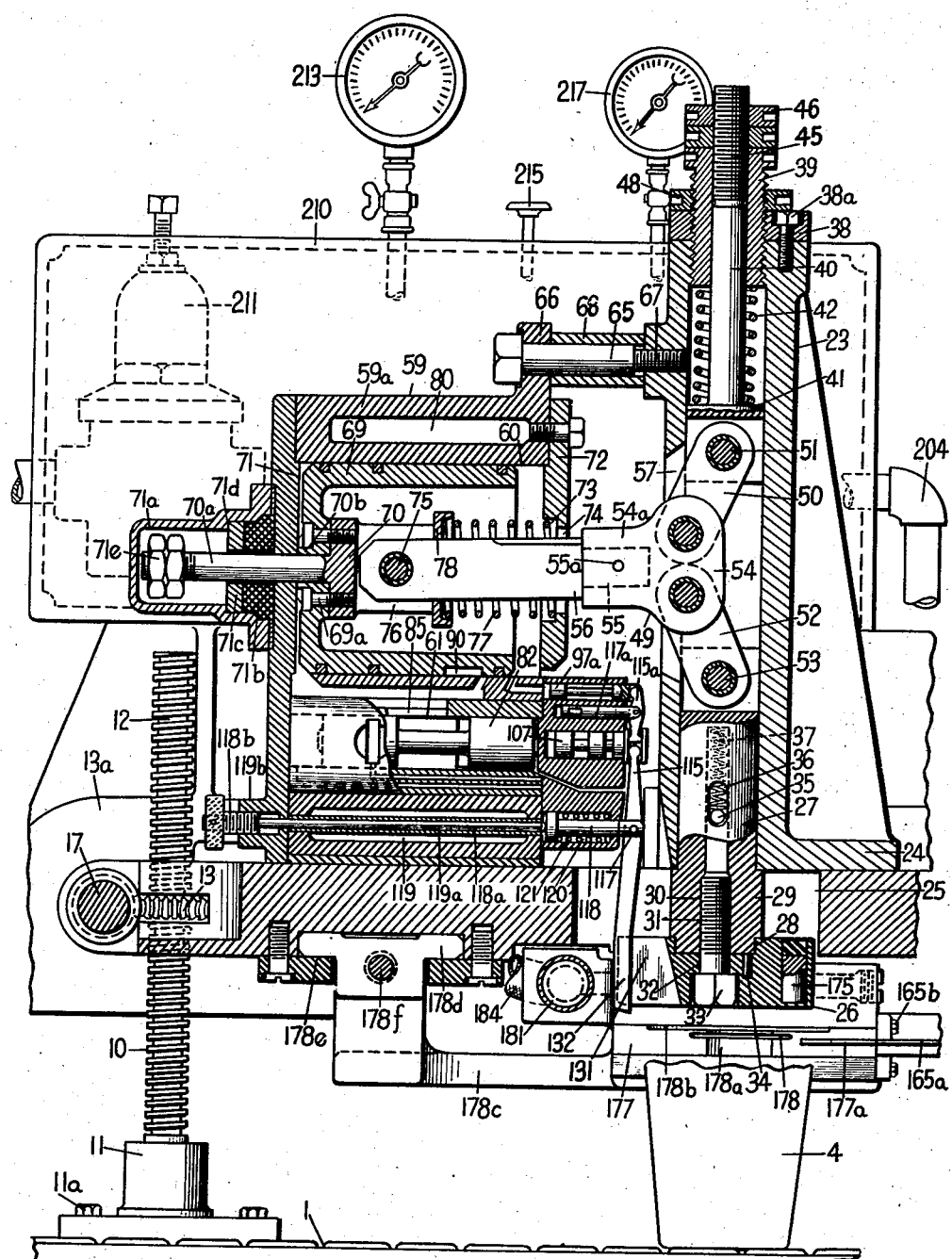
Figure 4 is a longitudinal vertical sectional view taken substantially along line 4—4 of Figure 2 illustrating the sealing head unit and its operating mechanism.

The actuating mechanism for the sealing head 26 is normally in the condition illustrated in Figure 4. The plunger 40 will be held in its lowermost position by the spring 42. The plunger 27 will be held in its uppermost position by the spring 37. The toggle joint 49 will be in the condition illustrated, that is, with its links at an angle to each other. It will be apparent that if the piston rod 56 is moved to the right (Figure 4), the toggle joint 49 will be straightened out. This will force the plunger 27 downwardly against the action of spring 37 and, consequently, will force the sealing head 26 downwardly. As soon as the piston rod 56 moves to the left, the spring 37 will return member 26 to its uppermost position. The spring-pressed plunger 40 is provided to limit the downward force exerted on the plunger 27 to a predetermined maximum, so as to prevent injury to the container being sealed. This predetermined maximum is determined by the initial adjustment of the distance between the lower end of collar 39 and the flange 41, which varies the downward force exerted by the spring 42. When the downward force created by the toggle 49 on the plunger 27 reaches the predetermined maximum, the plunger 40 will be forced upwardly against the resistance of the spring 42. Consequently, the pressure exerted on plunger 27 will not be excessive. It will be apparent that during operation of the toggle joint, the piston rod 56 will move vertically to a limited extent. Adjusting the plunger unit vertically by means of the member 39, as previously described, will vary the extent of the downward movement of the plunger 27 and, consequently, of the member 26. Thus, the extent of the downward movement of member 26 may be readily adjusted.

For controlling movement of the piston rod 56, I provide the mechanism now to be described. This mechanism comprises a fluid-operated cylinder and piston unit 59. This unit 59 includes a housing 59a which has a large cylinder bore 60 formed in its upper portion and a small cylinder bore 61 formed in its lower portion. The bores 60 and 61 are horizontally disposed and are parallel with each other. The housing 59a is mounted on the upper surface of the plate 9 directly adjacent the housing 23. It is provided with a flattened lower surface which rests on the upper surface of plate 9. To secure the housing 59a to the housing 23, the housing 23 is provided with laterally projecting lugs 23a (Figures 3 and 6), through which bolts 62 pass. Bolts 62 have their ends threaded into the housing 59a and spacers 63 are provided on the bolts. A large bolt 65 (Figure 4) is passed horizontally through an upstanding lug 66 on the housing 59a and has its outer end threaded into a boss on the housing portion 23, as at 67. A spacer 68 is provided on the bolt 65. Thus, it will be apparent that the housing 59a is held firmly in position.

The bore 60 has a hollow piston 69 slidably mounted therein. This cylinder 69 has a member 70 disposed therewithin which is secured to its end wall by means of bolts 69a. The member 70 has a reduced extension 70a which extends to the left (Figure 4) through the end of the piston and through a boss 70b formed thereon. This boss 70b will normally contact with the end of the bore 60 to keep the piston spaced from the head 71 disposed at the left hand end of housing 59a. The portion 70a extends through the head 71 and into a housing 71a which is secured to the head 71. A cushion member 71b of rubber surrounds portion 70a and abuts the head 71. A metal collar 71c holds the member 71b in position by contacting with a shoulder 71d formed on the inner surface of housing 71a. The end of the portion 70a is threaded to receive nuts 71e which may be adjusted to various positions therealong. The nuts 71e will contact with member 71c when the piston 69 moves to the right. They serve as an adjustable stop for limiting such movement to prevent the links 50 and 52 of the toggle from moving past the axes of plungers 27 and 40. The member 71b serves as a cushion to reduce the shock of the impact.

A cap 72 is bolted to the other end of the housing 59a and is provided with an opening 74. The piston rod 56 passes inwardly through this opening into the interior of the bore 60. The inner end of the piston rod 56 is flattened and is pivotally connected at 75 to a bifurcated lug 76 formed on the member 70. The opening 74 is larger than the piston rod 56 so as to permit limited movement of the piston rod therein. A compression spring 77 is disposed within the bore 60 in surrounding relationship to the rod 56. One end of the spring bears against the cap 72 and is disposed in a recess 73 formed therein while the opposite end bears against a flanged collar 78, which is formed integral with member 70. It will be apparent that this spring normally tends to force the piston 69 to the left so that the boss 70b contacts with the head 71. Consequently, this will also keep the toggle joint 49 in the condition illustrated in Figure 4.

I preferably employ steam as the fluid for moving the piston 69 from the position indicated in Figure 4. The housing 59a has a steam jacket 80 formed in the wall thereof and extending completely around the housing. A main steam line 81 (Figure 10) is adapted to convey steam into this jacket. This jacket serves to prevent or decrease condensation of the steam within the housing 59a. The line 81 is connected to a suitable source of supply in a manner to be described.

Figure 8:
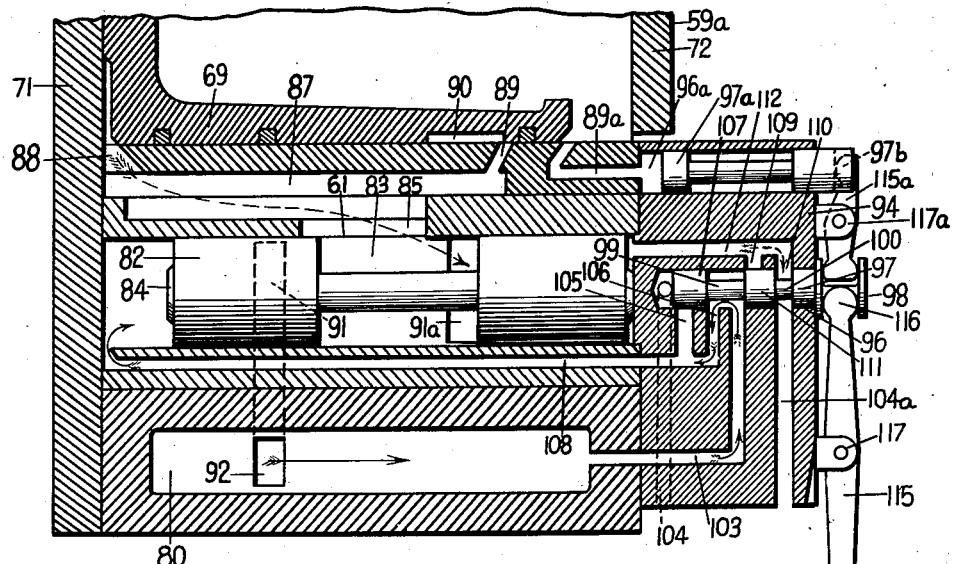
Figure 8 is a vertical sectional view of the valve which is used for controlling operation of the sealing head, the valve being shown in its normal position.
Figure 9:
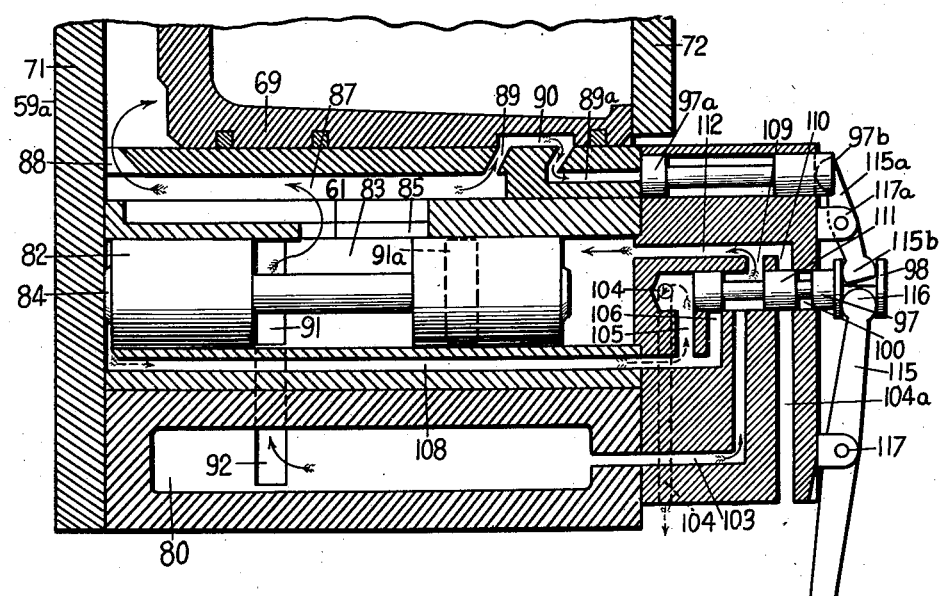
Figure 9 is a similar view but showing the valve in its operative position.

The bore 61 has a piston type valve 82 mounted for axial movement therein, as shown best in Figures 4, 8 and 9. This piston valve 82 is adapted to control the supply of steam to and exhaust of steam from the cylinder bore 60. Intermediate its ends the piston valve 82 is provided with an annular chamber 83 and at its extreme ends the piston valve 82 is provided with projecting portions 84. An exhaust and inlet opening 85 is provided in the wall of the bore 61 intermediate the ends thereof and communicates with a longitudinal passageway 87. Opening 85 is always in communication with annular chamber 83. The passageway 87 has one end communicating with an opening 88 which leads into the cylinder bore 60 adjacent the head 71. The opposite end of the passageway 87 communicates with an opening 89 which leads through the wall of the bore 60. The opening 89 communicates with a longitudinally extending groove 90 formed in the periphery of the piston 69. When the piston 69 is in the position indicated in Figure 8, the opening 89 will not be in communication with a passageway 89a, formed in the wall of bore 60, but when the piston 69 moves to the position indicated in Figure 9, the groove 90 will be in such a position that it will connect opening 89 to passageway 89a. The outer end of passageway 89a is uncovered with the piston 69 as in Figure 8.

At spaced points in the wall of the bore 61 an inlet opening 91 and an outlet opening 91a are formed. The inlet opening 91 is connected to an opening 92 leading from the steam jacket 80. The opening 91a leads to the atmosphere. With piston valve 82 in the position shown in Figure 8, the annular chamber 83 is in communication with exhaust opening 91a and piston 82 covers opening 91. With piston 82 in the position indicated in Figure 9, chamber 83 is in communication with inlet opening 91 and exhaust opening 91a is covered by the piston.

With the piston 82 in the position indicated in Figure 8, steam will exhaust from the left hand end of the cylinder bore 60, through opening 88, passage 87, opening 85, annular chamber 83, and exhaust opening 91a. The piston 82, when in the position indicated in Figure 8, will cover the inlet opening 91. Consequently, steam will not be supplied to the cylinder bore 60.

For controlling movement of the piston valve 82, I provide a valve mounted in an extension 94 (Figures 8 and 9) of the housing 59a. This extension is preferably of the shape shown in Figure 5 and is bolted to housing 59a by bolts 95. A cylindrical bore 96 is formed in the main portion of the extension 94. The bore 96 receives a piston 97, which is mounted for axial movement therein. The outer end of the piston carries a pair of spaced collars 98 the inner one of which serves to limit inward movement of the piston. The portion of the piston 97 which is disposed in the bore 96 has a large annular chamber 99 formed therein and a small annular chamber 100 formed therein in axial spaced relationship. A steam passageway 103 connects the steam chamber 80 to the annular chamber 99 formed in the piston 97. An exhaust passageway 104 connects the left hand end of bore 96 to the atmosphere. Spaced passageways 105 and 106 communicate with the bore 96 and, when the piston 97 is in the position indicated in Figure 8, the end 107 of the piston covers the end of passageway 105 while the end of passageway 106 communicates with the chamber 99 in the piston. These passageways 105 and 106 are connected to a passageway 108 which is connected to the left hand end of the cylinder bore 61. Axially spaced passageways 109 and 110 communicate with the bore 96 and, when the piston 97 is in the position indicated in Figure 8, the central portion 111 thereof covers the end of passageway 109 and the passageway 110 communicates with the annular chamber 100 of the piston 97. The passageways 109 and 110 are connected to a passageway 112 which is connected to the right hand end of the bore 61. An exhaust passageway 104a leads from the right hand end of bore 96 to the atmosphere.

It will be apparent that with the piston 97 in the position indicated in Figure 8, steam will flow from the chamber 80, through the passageway 103, through annular chamber 99 of piston 97, through passageways 106 and 108, to the left hand end of the bore 61, and will force the piston 82 to the right. At the same time, any steam in the right hand end of the bore 61 will exhaust through passageway 112, passageway 110, annular chamber 100 and exhaust passageway 104a. Thus, the inlet opening 91 will be covered by the piston 82, while the exhaust opening 91a will be uncovered. Consequently, steam from the left hand end of the cylinder bore 60 will exhaust through the opening 88, passageway 87, opening 85, chamber 83 and exhaust opening 91a. Thus, the spring 77 will be permitted to return the piston 69 to the position indicated in Figure 8.

However, if the piston 97 is moved to the right, as indicated in Figure 9, steam will be supplied to the left hand end of the cylinder bore 60 to move the piston 69 to the right. It will be apparent that when the piston 97 is moved to the right, steam will flow from the passageway 103, through the annular chamber 99 in piston 97, through the passageway 109, through passageway 112 (the passageway 110 having its end closed at this time by the portion 111 of the piston) to the right hand end of the bore 61, which will cause the piston 82 to move to the left. At the same time, the steam in the left hand end of the bore 61 will exhaust through the passageway 108, through passageway 105 (the end of passageway 106 being closed by the end 107 of piston 97 at this time) through the left hand end of bore 96 and through passageway 104 to the atmosphere. When the piston 82 is moved to the position indicated in Figure 9, the inlet opening 91 is uncovered while the exhaust opening 91a is covered. Consequently, steam will flow from the chamber 80 through opening 92, through opening 91 into chamber 83, through opening 85, passage 87 and finally through opening 88, into the left hand end of the bore 60. This will force the piston 69 to the right.

When the piston 69 moves to the right sufficiently, the opening 89 communicates with the passageway 89a. This will permit steam to flow from passage 87 into passageway 89a and into the bore 96a which is formed in the upper portion of extension 94. This will force the piston 97a, mounted in bore 96a, from the position indicated in Figure 9 into the position indicated in Figure 8. Movement of the piston 97a to the right (Figure 8) is adapted to move piston 97 to the left to return it to its original position. For this purpose, a short lever 115a is provided which has its upper end in engagement with the outer end of piston 97a, as at 97b, and has a yoke 115b on its lower end which straddles piston 97 between collars 98. The lever 115a is pivoted to the outer end of a pin 117a (Figure 4) which is mounted in extension 94 for axial adjustment and is held in adjusted position by a set screw 117b (Figure 5) which engages a flat portion of the pin to prevent rotation thereof. Thus, when piston 97a is moved to the right, piston 97 will be moved to the left. When piston 97 is moved to the right, piston 97a is moved to the left.

The piston 97 must be moved to the right mechanically by means of a lever 115. This will move the piston 69 to the right, as described above. However, as soon as the piston 69 moves sufficiently the piston 97 will be returned to its original position by steam pressure, as described above. Thus, movement of the piston 97 to the right is controlled mechanically while movement of the piston to the left is accomplished automatically by steam pressure.

For moving the piston 97 to the right, I provide the pivoted lever 115, as previously described. This lever has a yoke portion 116 on its upper end which engages the piston 97 between the collars 98, as shown best in Figures 4, 8 and 9. The lever 115 is pivoted to the bifurcated outer end 117 of a plunger 118. The plunger 118 is disposed for axial movement in a bore 120 formed in the housing extension 94. A compression spring 121 is provided in the bore 120 for normally forcing the plunger 118 to the left. A pin 118a is disposed for axial movement in a tube 119a disposed in fixed position in a bore 119 in housing portion 59a. One end of pin 118a engages the plunger 118 while the other end thereof is engaged by the inner end of a screw 118b threaded into a boss 119b formed on the cap 71. It will be apparent that by rotating member 118b, the pivot point for the lever 115 may be adjusted to the right or to the left (Figure 4).

The lower end of the lever 115 is provided with a finger portion 132 which is disposed adjacent the edge of member 26 in alignment with a vertical slot 131 formed therein which is of sufficient width to permit movement of the lever thereinto, if necessary. The finger portion 132 extends downwardly beyond the lower surface of the member 26, when the member 26 is in its uppermost position. Adjustment of the plunger 118 will move the lower end 132 of lever 115 into or out of slot 131, to properly position it at the point where the edge of the cap will be disposed when it is carried on the head 26 in sealing position. The proper position of finger 132 will vary with variations in diameters of the caps being used.

The cap-feeding and applying unit 2 is illustrated best in Figures 3, 6, 7 and 11 to 13, inclusive. This unit comprises a plate 133 which is suitably mounted on the plate 9 over a large opening 25a (Figure 2) in the plate 9. This plate 133 has a portion 134 which extends down into the opening 25a. The plate 133 is held in position on plate 9 by means of pins 135 extending into openings formed therein so that it may be readily removed. The plate 133 is provided with a centrally disposed opening 136 which is in alignment with the sealing head 26. This opening 136 is of the proper size to permit the caps, to be applied to the containers, to drop freely therethrough. The plate 133 carries four upstanding posts 137 which are spaced circumferentially around the opening 136. These posts 137 are adapted to receive a stack of the nested caps. The plate 133 has a plate 133a bolted by means of bolts 133b to the lower surface thereof. Plate 133a has an opening corresponding with opening 136.

For controlling the feed of the caps downwardly through the opening 136, I provide the following structure. This structure embodies a pair of cap separating wedge members 138. These wedge members 138 are disposed tangentially to the opening 136, as indicated best in Figure 3. They are mounted for longitudinal movement in recesses 138a formed in the lower surface of the plate 133. The recesses 138a extend substantially tangential to opening 136 and are in communication therewith at their inner edges. The lower wall of these recesses is formed by plate 133a. The members 138 are connected together at one end by a bar 139. The other ends of members 138 engage a bar 140. The bar 140 carries a pin 141 (Figure 6) which is mounted for axial movement in a bearing portion 9a formed on the plate 9. A small plate 143 is attached to the lower surface of portion 9a and extends beneath bar 140. This plate carries a pin 144 on its inner end to which one end of a spring 145 is attached. The other end of the spring 145 is connected to a depending pin 141a carried on the outer end of pin 141. The spring 145 will tend to pull the bar 140 to the right, holding the bar in contact with the ends of members 138. This will also hold the bar 139 in contact with the outer end of piston rod 146. The piston rod 146 is carried by a piston 146a disposed in a cylinder 147 carried by the plate 9. The piston 146a is provided with a projection 146b on its outer end which engages the end of cylinder 147 to keep the piston spaced therefrom. The piston 146a is normally held in the position indicated in Figure 6. It will be apparent that when the piston is reciprocated, the members 138 will also be reciprocated.

Figure 11:
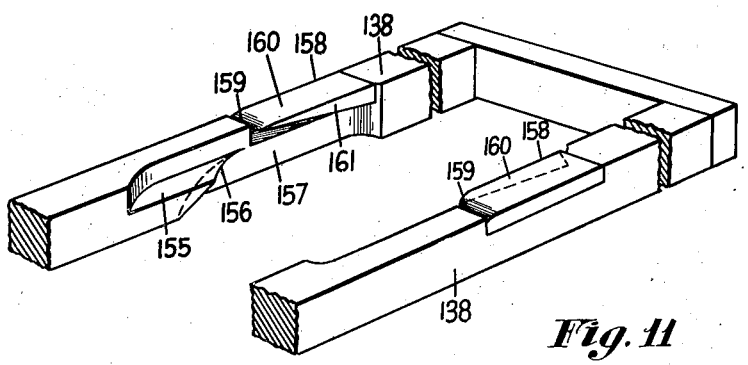
Figure 11 is a perspective view of the separating wedges of the cap feeding unit, showing them in association with each other.
Figure 13:
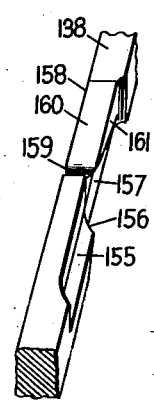
Figure 13 is a perspective view of one of the wedges.

The members 138 are of the shape shown best in Figures 11 and 13. Each of the members 138 is notched intermediate its ends to provide a recessed flat vertical surface 157. This surface has a cap-supporting shelf 155 formed adjacent one end thereof and a cap-separating wedge portion 158 projecting inwardly past said surface adjacent the opposite end thereof. The portion 155 has a knife edge 156 formed thereon.

The wedge portion 158 is provided with a horizontally disposed upper edge 160 which is spaced above the top surface of portion 155 a distance substantially equal to the thickness of a cap. The lower edge 161 of wedge portion 158 is inclined so that the end 159 of portion 158 is pointed. The points 156 and 159 are spaced apart. The members 138 are normally in such a position that the lowermost cap will be supported by the projecting portions 155 of the members 138 which will project into opening 136. However, when the members 138 are moved to the left (Figure 6) by outward movement of the piston 146a, this causes the portions 155 thereof to be withdrawn from the opening 136, permitting the lowermost cap to drop from the opening. At the same time that the portions 155 are withdrawn, the pointed ends 159 of the cam portions 158, which are normally out of opening 136, are projected into opening 136 and pass between the lowermost cap and the cap next above.

The wedge-shaped portions 158 actually serve to force the lowermost cap downwardly. It is desirable to have this positive action rather than to rely upon gravity, because the caps may tend to stick together. The straight upper edges 160 of the portions 158 will support the cap next above and the entire stack during the time portions 155 are in withdrawn position. As soon as the members 138 are returned to their original positions, the portions 155 will again project into the opening 136 and the lowermost cap will rest thereon, since the wedge portions 158 have been moved from beneath the cap which they were previously supporting and have been withdrawn from opening 136. Thus, it will be apparent that each time the members 138 are moved to the left (Figure 6) a single cap will drop through the opening 136.

It will be apparent that the unit, consisting of plate 133, posts 137, carried by such plate, and members 138, mounted for longitudinal movement in guides in said plate, together with bar 139, can be readily removed and be replaced with a similar unit for different size caps. The removal of this unit is facilitated because piston rod 146 and member 140 are not mechanically connected thereto.

The cap released from the stack will drop downwardly onto a tongue member 162 which is secured to member 133a. The tongue member 162 extends beneath the opening 136. It is held in position by means of a pin 162a which extends through an opening in a vertical extension of member 162 and into an opening in member 133a. The pin 162a is split so that it will be held in the opening by friction and is formed in the inner end of a handle 162b. The tongue may be readily removed and replaced with a different size tongue when desired.

Figure 7:
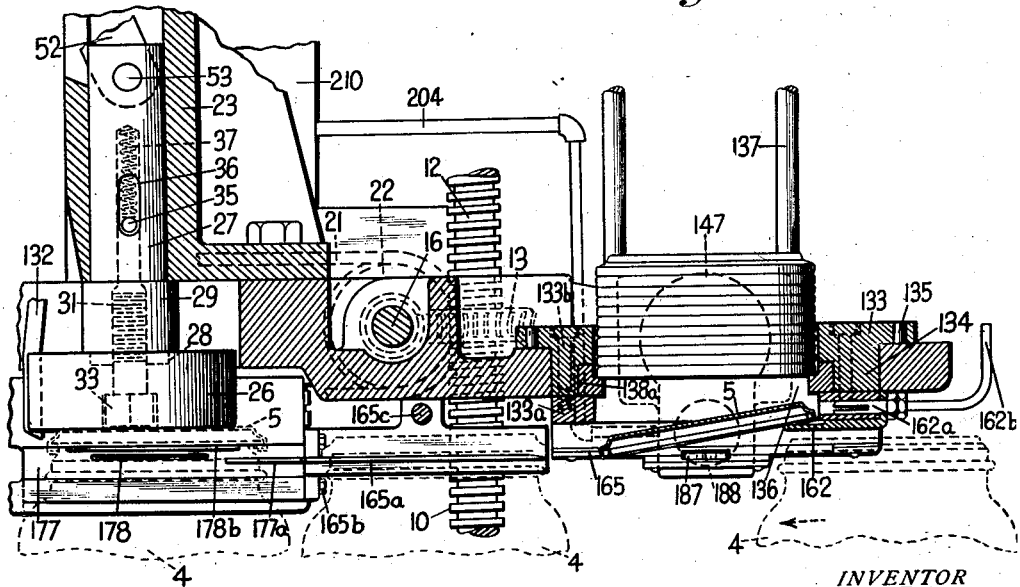
Figure 7 is a longitudinal vertical sectional view taken substantially along line 7—7 of Figure 2.

Disposed beneath plate 133a and bolted thereto is a pair of parallel tracks 165 (Figures 3 and 7) which extend forwardly towards the sealing head 26. These tracks 165 are spaced apart a proper distance so that they will support the cap 5 released from the stack. Thus, the cap will be supported in an inclined position, as indicated in Figure 7, by the tracks 165 engaging it at diametrically opposed points and by the tongue member 162 engaging the rear edge thereof. Although the members 165 are spaced a distance such that the cap will rest thereon, they are spaced sufficiently to permit the upper end of the container to pass therebetween, it being understood that the cap is slightly greater in diameter than the upper end of the container.

It will be apparent that all parts of the cap feeding unit are carried by the plate 133. Consequently when different sized caps are used, the entire unit may be removed easily and quickly and replaced with a different unit adapted to contain and feed caps of a different size. When removing the cap feeding unit, the pin 162a may be removed by withdrawing handle 162b to permit the removal of tongue 162 so that the cap feeding unit may be lifted out of position.

Figure 3:
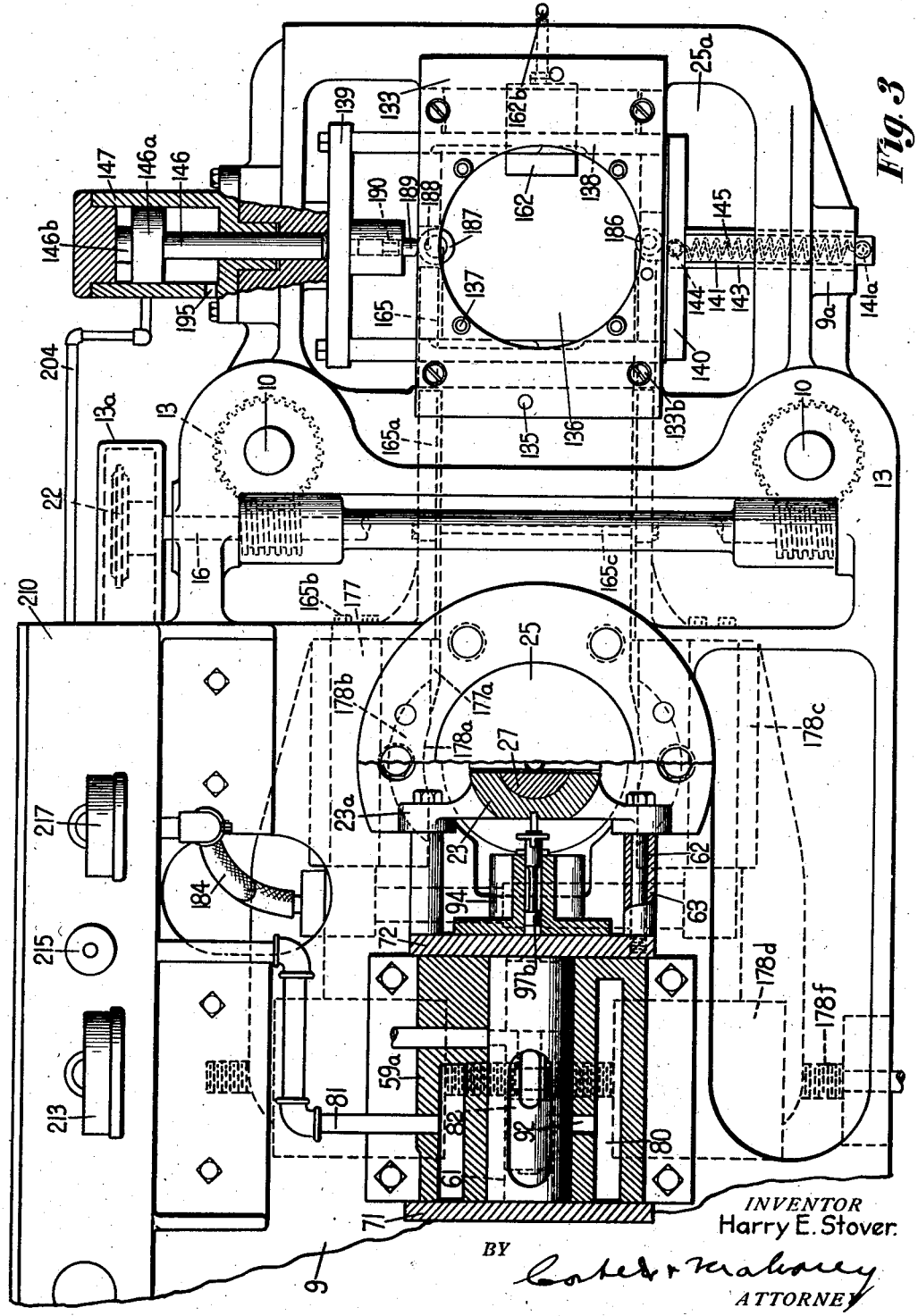
Figure 3 is a horizontal sectional view taken substantially along line 3—3 of Figure 1 and showing the sealing head and the cap feeding and applying unit.

When the conveyer moves a container beneath the cap feeding unit 2, the upper end of the container will engage the skirt of the inclined cap disposed in the position indicated in Figure 7. This will move the cap along the tracks 165 with the container, and onto tracks 165a which extend to a point adjacent the sealing head 26 (Figure 3). The tracks 165a are supported in a manner to be explained later. The cap and container will be moved along until they pass beneath the sealing head 26. The sealing head has means associated therewith for lifting the cap slightly from the container. This means comprises a plurality of small magnets 174 (Figure 5) which are arranged in circumferentially spaced relationship. An additional magnet 175 (Figure 4) is disposed closely adjacent the edge of member 26 which will first be approached by the cap. The magnets are of cylindrical form and are mounted in sockets formed in the head 26 which is of non-magnetic material. These sockets do not extend quite completely through the head 26. The upper end of each socket receives a cylindrical portion 176 of rubber which fits tightly therewithin and tends to hold the magnet in position.

As the container with the cap thereon moves beneath the sealing head 26, the forward edge of the cap will first be lifted by the magnet 175. Continued movement of the container will cause the magnets to act on the cap to hold it up against the lower surface of the member 26. Even with the cap in firm contact with the member 26, the skirt of the cap will still surround the upper end of the container so that it will be moved along with the container. However, the cap will be spaced sufficiently from the upper end of the container to permit steam to be injected therein.

Figure 5:
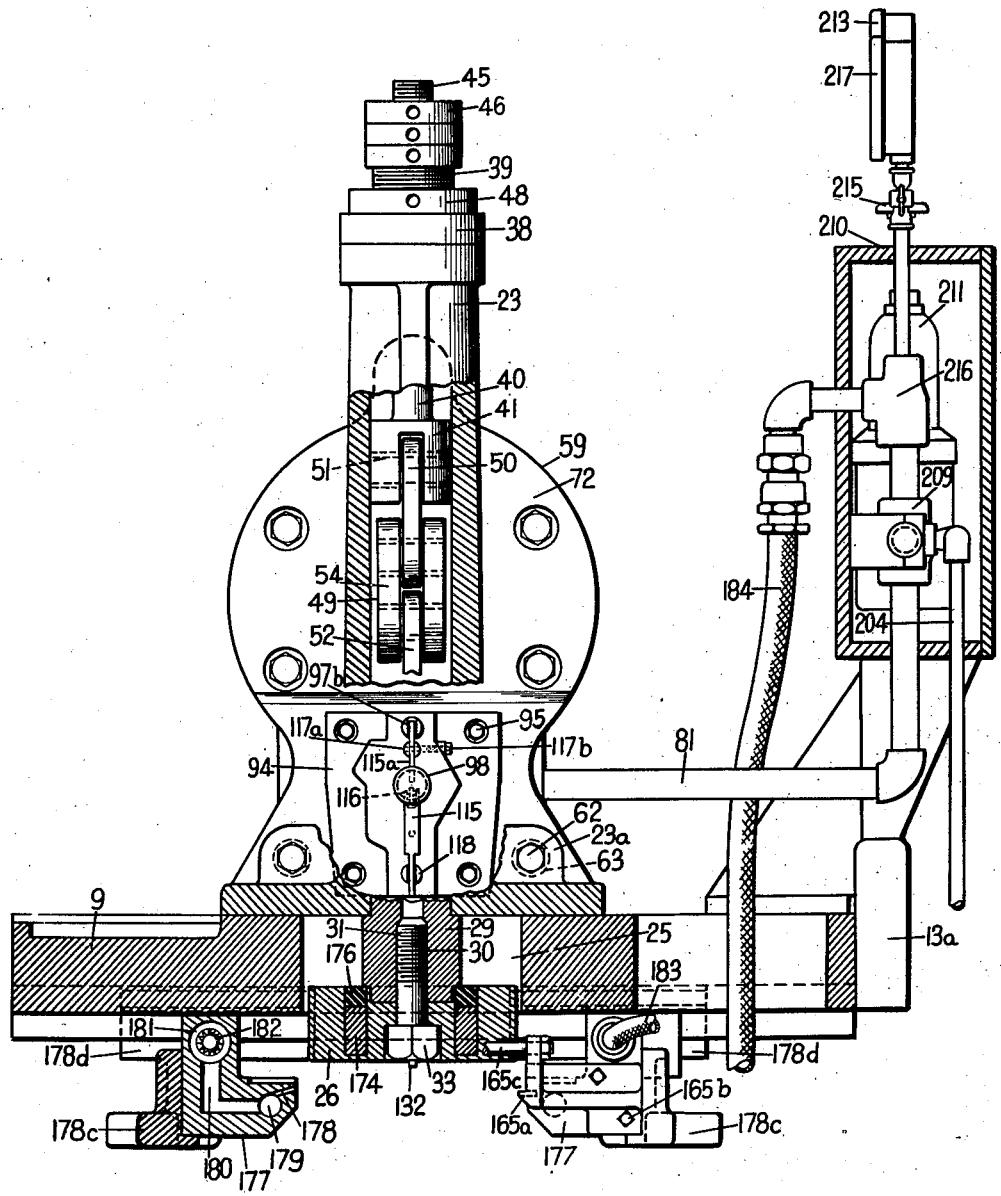
Figure 5 is a transverse vertical sectional view taken substantially along line 5—5 of Figure 2.
Figure 10:
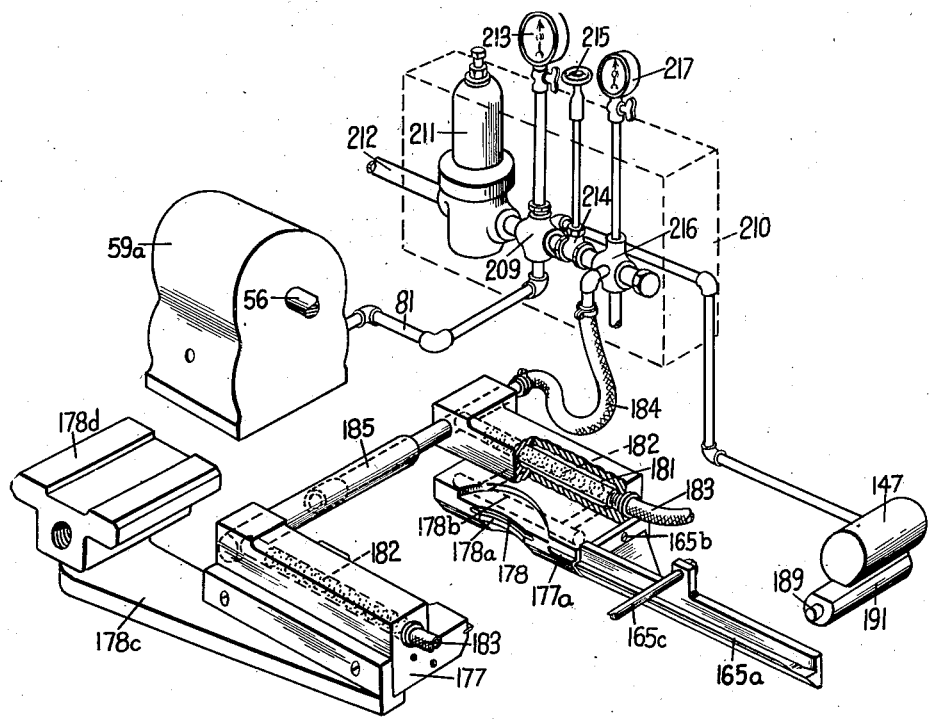
Figure 10 is a perspective view, partly broken away, of the main units of the fluid system.

The means for injecting the steam into the upper end of the container comprises a pair of steam jet members 177 which are provided with steam slots 178. The members 177 are in spaced parallel relationship and extend along the member 26. The members 177 are carried by arms 178c which are, in turn, carried by guide members 178d (Figures 4, 5 and 10). These guide members 178d are suitably mounted in guideways 178e on the bottom of plate 9. A screw member 178f has oppositely threaded portions engaging the members 178d and is carried by the plate 9 in such a manner that it will not move axially. It will be understood that by rotating screw 178f the distance between the members 177 may be adjusted.

The tracks 165a are supported in the manner illustrated best in Figure 10. They are bolted, as at 165b, to the ends of the members 177. A bolt 165c extends transversely of the tracks and connects them together to prevent spreading thereof. The inner edges of the members 177 have short track sections 177a disposed thereon which are in alignment with the tracks 165a. The cap will be moved along by the conveyer over the track sections 165, 165a and 177a until it comes beneath the sealing head 26. Since the track members 165a are carried by the members 177, the distance between them will be varied with adjustment of the distance between the members 177. During this adjustment the bolt 165c must be disconnected and after the adjustment, it may be replaced.

The inner edge of each of the members 177 is provided with an arcuate cutaway portion 178a adjacent the slot 178 which serves to direct the steam more effectively around the upper end of the container and also eliminates any chance of interference of the cap with the members 177 during the time the cap is being lifted. The upper surface of the member 177 is provided with an arcuate recess 178b which serves to form a pocket for the steam and direct it around the container.

Each of the members 177 has a longitudinally extending passageway 179 (Figure 5) which communicates with the outlet slot 178. This passageway 179 is connected by means of a passageway 180 to a longitudinally extending tubular chamber 181. This chamber 181 receives a hollow tubular electric heater 182. The heater 182 is of such a type that it will not be injured by moisture and is connected to a suitable source of power by means of a conduit 183. A flexible conduit 184 (Figure 10) is connected to the chamber 181 of one of the members 177. The chamber 181 of this member 177 is connected to the chamber 181 of the other member 177 by means of a telescoping tube 185. Thus, steam will be supplied to both of the members 177 regardless of their position of adjustment. The steam entering the chambers 181 will pass around the heaters 182 and will be dried by such heaters. This eliminates the necessity of providing a steam superheater of the type disclosed in said co-pending application S. N. 314,299.

In order to supply steam to the cylinder 147 to actuate the cap feeding unit, I provide means which is actuated by movement of the container into a position below the cap feeding and applying unit. As illustrated best in Figures 3, 6 and 7, this means comprises a small roller 186 which is held in a fixed position on the lower side of plate 133a. This member 186 is located directly below the opening 136 substantially in alignment with the piston rod 146, as illustrated best in Figure 3. At a diametrically opposed point a washer member 187 is disposed on the plate 133a. A small pin 188 prevents complete removal of the washer but it is free to move to a considerable extent. A plunger 189 normally engages the washer 187 and holds it in its outermost position.

The plunger 189, as shown best in Figure 6, is disposed for reciprocation in a bore 190 formed in a valve housing 191 mounted on the cylinder 147. The plunger is provided with a reduced portion with which the inner end of a set screw 192 cooperates to permit limited movement of the plunger but to prevent complete withdrawal thereof. The plunger is normally held in its outermost position by means of a spring 193. The bore 190 communicates with a passageway 194 which leads into the left hand end of cylinder 147. This end of the cylinder is provided with an exhaust outlet 195. A second passageway 196 communicates with the bore 190. The end 197 of this passageway is normally uncovered by the plunger 189. This passageway 196 communicates with a chamber 199 in which a piston valve 200 is disposed for reciprocation. This piston valve 200 is reduced to form an annular chamber 201. The annular chamber 201 is in communication with the passageway 196 by means of a small bore 202 formed in piston valve 200. The chamber 201 is also always in communication with a steam inlet 203 which is connected to a steam conduit 204. The opening 147a at the right hand end of the cylinder 147 communicates with the bore 199 through the medium of an opening 205 in member 191. The valve 200 is normally held in the position indicated in Figure 6 by means of a spring 206, the force of which is adjustable by means of a screw 207. The opening 205 is normally uncovered by the piston valve 200 and is in communication with an exhaust opening 208.

With the parts in the position illustrated in Figure 6, steam will flow from the line 204 through annular chamber 201, through the bore 202, passage 196, passage 194 and through the exhaust outlet 195. The passageway 202 is small so that a small amount of steam only will normally escape and this will serve to keep the steam live. As soon as a container is brought by the conveyer beneath the cap feeding and applying unit 2, the upper end of it will engage the roller 186 and the washer 187. This will happen substantially at the same instant that the forward edge of the container engages the inclined cap and tends to withdraw it from its inclined position on the tongue 162. Engagement of the upper end of the container with the washer 187 will force it outwardly, it being understood that the inner edge of the washer and the inner edge of the roller 186 are normally spaced apart a distance slightly less than the diameter of the upper end of the container.

Outward movement of the washer 187, will move the plunger 189 to the right closing the upper end 197 of the passageway 196. This will cause steam pressure to build up within the passage 196, forcing the piston valve 200 to the right. The piston valve will be moved to such a position that the exhaust opening 208 will be covered while the chamber 201 will be in communication with the opening 203. This will permit steam to flow into the right hand end of cylinder 147 and will force the piston 146a to the left, actuating the cap feed to drop another cap into the position indicated in Figure 7, it being understood that the cap previously in this position has been withdrawn and moved along by the container which engaged the washer 187. There will be a delayed action of the piston valve 200 until pressure in passage 196 builds up which will prevent interference of the cap dropped with the cap previously in such position. After the container moves beyond the washer 187, the plunger 189 will be returned to its original position by spring 193. This will expose the end 197 of the passageway 196, and will permit the steam to escape from passage 196 through passage 194. The reduction in pressure in the passage 196 will permit the piston valve 200 to be returned by the spring 206 to its original position. Then steam can escape from the right hand end of cylinder 147, through opening 147a and 200, through bore 199 and through the exhaust opening 208. This will permit the spring 145 to return the piston 146a to the position indicated in Figure 6. Thus, each time a container moves beneath the cap feeding unit and withdraws and moves along the cap supported by the tongue 162 and tracks 165, it will actuate the cap feed to drop another cap into such position.

As illustrated best in Figure 10, the line 204 for supplying steam to the cylinder 147 is connected to a fitting 209 disposed in a housing 210 mounted on the plate 9. The line 81 which supplies steam to the unit 59, for actuating the sealing head, is also connected to the fitting 209. A steam pressure regulating unit 211 of a suitable type is also disposed in housing 210 and is connected to the fitting 209. The main steam line 212 leads into the unit 211. The line 212 is connected to a suitable source of supply. The unit 211 will reduce the pressure of the steam coming from the line 212. A steam pressure gage 213 is also connected to the fitting 209 and will indicate the pressure of the steam flowing to the unit 59 and the cylinder 147. Beyond the fitting 209 in housing 210 a needle valve unit 214 is provided which is adjustable by means of a rotatable knob 215. The valve 214 is connected to a fitting 216, disposed in housing 210, to which the line 184 is connected. A pressure gage 217 is also connected to the fitting 216 and will indicate the pressure of the steam flowing through the line 184 into the members 177. The valve 214 is preferably so adjusted that the pressure of the steam flowing through the line 184 is considerably less than that flowing through the lines 81 and 204. The gages 217 and 213 and the knob 215 are disposed outside and above the housing 210.

From the preceding description, the operation of the entire machine will be well understood. The conveyer will be continuously driven and the plate 9 will be adjusted to the proper height above the conveyer depending upon the height of the containers to be sealed. The members 177 will be properly adjusted relative to each other depending upon the diameter of the upper ends of the containers. The cap feeding unit will be of a suitable type to handle caps of the correct size to be applied to the containers. The containers will be placed indiscriminately on the conveyer and will be moved beneath the units 2 and 3. As a container is moved beneath the unit 2, it will withdraw a cap from said unit in the manner previously described. The container with a cap loosely thereon will then be moved beneath the sealing head 26. When the container moves beneath the head 26, the magnets serve to lift the cap against the head 26. However, the upper end of the container will still engage the skirt of the cap and will move it along therewith. As soon as the cap contacts the lower end of the trigger or finger 132, the control valves will be actuated to supply steam to move the piston 69 to the right. This will cause the piston rod 56 to actuate the toggle joint 49 which will, in turn, force the sealing head 26 downwardly. This will force the cap onto the container, as previously indicated. Thus, as the container moves into and reaches sealing position, it will automatically actuate the sealing head unit, provided a cap is disposed on the upper end of the container. Before the cap is forced on the container, the cap is sterilized and the air in the upper end of the container is displaced by steam. This is accomplished by means of the steam jets 177 from which steam continuously issues.

In sealing the cap on the container, forcing of the gasket over the upper end of the container, in itself, serves to hold the cap on the container. However, the condensation of the steam in the container beneath the cap, which occurs immediately, produces a partial vacuum which is the main force serving to hold the cap on the container and which also aids in preventing spoilage of the contents of the container. The sealing occurs substantially simultaneously with the injection of the steam into the container and, consequently, the steam will not have much chance of escaping from the container before it is sealed. During the sealing operation, movement of the container along with the conveyer is interrupted. Suitable mechanism for this purpose may be associated with the conveyer unit. For example, it may be of the type disclosed in Serial No. 314,299. However, immediately after the sealing operation occurs, the container will again be moved along with the continuously moving conveyer and will be moved away from sealing position. As previously stated, the container sealing mechanism will not function if a container which has no cap thereon, passes therebeneath.

When the sealing head 26 moves down sufficiently to force the cap downwardly into sealing position on a container, the cap will be out of engagement with the finger 132. Then the mechanism previously described may function to return the finger 132 to its original position. It will be noted that each time a container passes the cap feeding unit, it is actuated to feed a single cap into position to be engaged by the next container. It will also be noted that low pressure steam can be employed for operating the sealing mechanism, since the toggle joint 49 will serve to multiply the force produced by movement of the piston 69. As previously explained, the extent of the downward movement of member 26 may be varied and the maximum pressure created by such member on the cap and container may be varied.

As previously indicated, the sealing head will not be actuated if a container without a cap is moved therebeneath, because the finger 132 of the actuating lever 115 will not be engaged. Therefore, the upper end of the container will not be damaged.

It will be apparent from the above description that I have provided a novel stop structure in association with the cylinder and piston unit which actuates the sealing head, and this stop structure prevents movement of the toggle structure past center during actuation of the sealing head. Also, it will be apparent that I have provided a novel cushion structure which prevents excessive shock as the piston reaches the extent of its movement in actuating the sealing head.

Having thus described my invention, what I claim is:

1. Apparatus of the type described for sealing containers comprising means for applying a cap loosely on a container, a sealing member adapted to be moved to seal the cap on the container, means for moving said sealing member, said means comprising a fluid-operated cylinder and piston unit including a piston rod extending through both ends of the cylinder, and a mechanical connection between one end of said rod and said sealing member, said mechanical connection including a toggle joint which serves to transmit the pressure developed by said unit to said sealing member, and means associated with said cylinder and piston unit to limit movement of the piston so as to prevent movement of the toggle joint past center, said means comprising a stop member carried by the opposite end of said rod and adapted to contact with the end of said cylinder.

2. Apparatus according to claim 1 wherein a cushioning member is provided on the end of the cylinder with which said stop member will contact for reducing shock when the piston reaches the extent of its movement.

3. Apparatus of the type described for sealing containers comprising a support for a container, a sealing member adapted to be moved downwardly relative to said support to force a cap on the container, a horizontally disposed cylinder and piston unit for moving said sealing member, said sealing member having a vertically disposed plunger associated therewith, said cylinder and piston unit being provided with a horizontally disposed piston rod extending from both ends of the cylinder, means for connecting one end of said rod to said plunger and including a toggle joint, said toggle joint having the inner ends of its links pivoted to said piston rod, one of said links having its outer end connected to said plunger and the other of said links having its outer end connected to an independent support and stop means associated with the other end of said piston rod for limiting movement thereof to prevent movement of said toggle links beyond center, said stop means comprising a member carried by the other end of said rod which contacts with the adjacent end of the cylinder.

4. Apparatus according to claim 3 wherein the stop means includes a cushioning member on the end of the cylinder with which said member carried by said rod contacts to reduce shock.

5. Apparatus of the type described for sealing containers comprising a support for a container, a sealing member adapted to be moved downwardly relative to said support to force a cap on the container, a horizontally disposed cylinder and piston unit for moving said sealing member, said sealing member being carried by a vertically disposed plunger, said cylinder and piston unit being provided with a horizontally disposed piston rod extending from both ends of the cylinder, means for connecting one end of said rod to said plunger and including a toggle joint, said toggle joint having the inner ends of its links pivoted to said piston rod, one of said links having its outer end connected to said plunger, a second vertically disposed plunger disposed in axial alignment with the first plunger, the other of said links having its outer end connected to said second plunger, a spring associated with said second plunger for normally preventing upward movement thereof but permitting upward movement thereof whenever the toggle joint applies an excessive pressure to the first plunger, and stop means associated with the other end of said piston rod for limiting movement thereof to prevent movement of said toggle links beyond center, said stop means comprising a member carried by said rod which contacts with the adjacent end of the cylinder.

6. Apparatus according to claim 5 wherein the stop member includes a cushioning member on the end of the cylinder with which said stop member contacts to reduce shock.

7. Apparatus of the type described for sealing containers comprising a support for a container, a sealing member adapted to be moved downwardly relative to said support to force a cap on the container, a horizontally disposed cylinder and piston unit for moving said sealing member, said sealing member being carried by a vertically disposed plunger, said cylinder and piston unit being provided with a horizontally disposed piston rod extending from both ends of the cylinder, means for connecting one end of said rod to said plunger and including a toggle joint, said toggle joint having the inner ends of its links pivoted to said piston rod, one of said links having its outer end connected to said plunger, a second vertically disposed plunger disposed in axial alignment with the first plunger and spaced above the first plunger, the other of said links having its outer end connected to said second plunger, a spring surrounding said second plunger, said spring having its lower end engaging a portion of the plunger and its upper end engaging an abutment which is normally stationary, means for adjusting the distance between said abutment and said portion of the plunger to vary the force exerted by said spring, said piston rod having a stop on its opposite end, said stop being adapted to contact with the cooperating end of the cylinder to limit movement of the piston.

8. Apparatus according to claim 7 wherein a cushioning member is associated with the end of the cylinder for contact with the stop to reduce shock.

9. Apparatus of the type described for sealing containers comprising a support for a container, a sealing member adapted to be moved downwardly relative to said support to force a cap on the container, a horizontally disposed cylinder and piston unit for moving said sealing member, said sealing member having a vertically disposed plunger associated therewith, said cylinder and piston unit being provided with a horizontally disposed piston rod extending from both ends of the cylinder, means for operatively connecting one end of said rod to said plunger, and stop means associated with the other end of said piston rod for limiting movement thereof to a predetermined extent, said stop means comprising a member carried by the end of said rod and which contacts with the adjacent end of the cylinder.

10. Apparatus according to claim 9 wherein the stop means includes a cushion member on the end of the cylinder with which said member carried by said rod contacts to reduce shock.

11. Apparatus according to claim 9 wherein said member is adjustably mounted on said rod.

12. Apparatus according to claim 1 wherein said stop member is adjustably carried by said rod.

13. Apparatus according to claim 3 wherein said member is adjustably carried by said rod.

HARRY E. STOVER.